United States Patent [19]
Velin et al.

[11] Patent Number: 6,106,654
[45] Date of Patent: Aug. 22, 2000

[54] PROCESS FOR THE MANUFACTURING OF A DECORATIVE THERMO-SETTING PLASTIC LAMINATE

[75] Inventors: Per-Erik Velin, Helsingborg; Nils-Joel Nilsson, Hässleholm; Kent Lindgren, Perstorp, all of Sweden

[73] Assignee: Perstorp AB, Perstorp, Sweden

[21] Appl. No.: 08/973,688

[22] PCT Filed: Jun. 18, 1996

[86] PCT No.: PCT/SE96/00796

§ 371 Date: Dec. 12, 1997

§ 102(e) Date: Dec. 12, 1997

[87] PCT Pub. No.: WO97/00172

PCT Pub. Date: Jan. 13, 1997

[30] Foreign Application Priority Data

Jun. 19, 1995 [SE] Sweden ................................. 9502218

[51] Int. Cl.[7] ..................................................... B32B 31/00
[52] U.S. Cl. ....................... 156/276; 156/279; 156/307.4; 427/204; 427/205; 428/148; 428/150
[58] Field of Search .................................... 156/279, 276, 156/307.4; 427/205, 204; 428/150, 148

[56] References Cited

U.S. PATENT DOCUMENTS

| | | | |
|---|---|---|---|
| 2,275,989 | 3/1942 | Perry | 156/279 |
| 3,190,786 | 6/1965 | Magill et al. | 156/279 |
| 3,661,673 | 5/1972 | Merriam | 156/279 |
| 4,940,503 | 7/1990 | Lindgren et al. | 156/279 |
| 5,362,557 | 11/1994 | Albrinck et al. | |
| 5,456,949 | 10/1995 | Albrinck et al. | 156/307.4 |

FOREIGN PATENT DOCUMENTS

| | | |
|---|---|---|
| 0219769 | 4/1987 | European Pat. Off. . |
| 0329154 | 8/1989 | European Pat. Off. . |
| 0519242 | 12/1992 | European Pat. Off. . |
| 53-21284 | 2/1978 | Japan ................................. 156/307.4 |

*Primary Examiner*—John J. Gallagher
*Attorney, Agent, or Firm*—Stevens, Davis, Miller & Mosher, L.L.P.

[57] ABSTRACT

Process for the manufacturing of a decorative thermosetting laminate with a wear-resistant and a scratch resistant surface layer, wherein a continuous paper web is impregnated with melamine-formaldehyde resin, that one side of the web is coated with hard particles with a size of 30–90 $\mu$m. After drying, the other side is coated with a melamine-formaldehyde resin containing hard particles with an average particle size of 1–15 $\mu$m. The paper is, after drying, placed as the uppermost sheet in a laminate with the side coated with the smallest particles directed upwards towards a continuous pressure surface.

29 Claims, 1 Drawing Sheet

PROCESS FOR THE MANUFACTURING OF A DECORATIVE THERMO-SETTING PLASTIC LAMINATE

BACKGROUND OF THE INVENTION

1. Field of the Invention

The present invention relates to a process for the manufacturing of a decorative thermosetting laminate with an abrasion and scratch resistant surface layer.

2. Description of the Related Art

Decorative thermosetting laminates are well known and used for instance as surface material for walls, cupboard doors, desktops, tabletops, for other furniture and as a flooring material.

Such laminates are often made of two to seven Kraft paper sheets impregnated with phenol-formaldehyde resin, a monochromatic or patterned decor paper sheet impregnated with melamine-formaldehyde resin and a fine so called overlay sheet of α-cellulose impregnated with melamine-formaldehyde resin.

The overlay sheet is intended to protect the decor paper sheet from abrasion. In certain cases the overlay sheet is omitted.

There are also laminates consisting of a base layer of particle board or fibre board provided with such a decor paper sheet and possible an overlay sheet. These sheets can be laminated towards the base layer under heat and pressure. If only a decor paper sheet is used then this can be glued towards the base layer.

The described laminates do have many good properties, it has however turned out that there is a great need of improving the abrasion resistance and the surface scratch resistance of laminates exposed to an extreme abrasion. This is especially the case for flooring laminates, but to a certain extent also for desktop and tabletop laminates.

According to the U.S. Pat. No. 4,940,503 the abrasion resistance of such laminates has successfully been improved. Then a paper web is impregnated with melamine-formaldehyde resin. At least one side of the web is coated with small dry and hard particles with an average particle size of about 1–80 $\mu$m, evenly distributed over the wet resin surface on the web whereafter the resin is dried. The particle coated web, so called prepreg is thereafter possibly cut into sheets. At least one such sheet or web is placed as a surface layer on a base layer and bonded thereto. The hereby produced laminate will have a good abrasion resistance.

The hard particles used according to the prior art normally have an average particle size of around 50 $\mu$m, which is an advantage from an abrasion point of view. It has, however turned out that the scratch resistance of laminates produced in the known way is not always satisfactory. Furthermore the press plates used during the laminating stage are scratched by the relatively big particles in the surface of the laminate. The press plates are very expensive and manufactured of a high quality steel. Intermediate layers of disposable aluminium foil are often used to protect these press plates which will affect the production cost.

There is a need to be able to produce an abrasion and scratch resistant decorative laminate and to avoid the above mentioned problems.

SUMMARY OF THE INVENTION

It has according to the present invention been possible to achieve a process for the manufacturing of a decorative thermosetting laminate with an abrasion and scratch resistant surface layer, which laminate comprises paper sheets impregnated with thermosetting resin. The process is characterised in that a first continuous paper web is impregnated with melamine-formaldehyde resin, that one side of the first web is coated with about 2–20 g/m$^2$, preferably about 6–12 g/m$^2$ of hard particles with an average particle size of about 30–90 $\mu$m, preferably around 40–70 $\mu$m. The particles are evenly distributed over the whole wet resin surface of the first paper web, after which the resin is dried. The other side of the web, or a second paper web is coated with a melamine-formaldehyde resin, where the resin contains hard particles with an average particle size of about 1–15 $\mu$m, preferably about 1–9 $\mu$m and in such an amount that the web will have a coating of about 1–15 g/m$^2$, preferably about 2–10 g/m$^2$ of these hard particles, whereafter the resin is dried. The particle-coated impregnated first paper web, a so called prepreg, is possibly cut into sheets. At least one of these possibly cut sheets of paper or web is placed as a surface layer on a base layer and bonded thereto whereby the surface coated with the smaller particles is placed so that it is directed towards the upper side of the laminate and the surface with the bigger particles is directed downwards. Alternatively the first sheet or web with the smaller particles is placed as the uppermost layer in the laminate with the particle coated side directed towards the upper side of the laminate and the second sheet or web with the bigger particles is placed under the uppermost layer with the particle-coated surface directed outwards.

The hard particles can consists of many different materials. Especially suitable materials are silicon dioxide, aluminium oxide, and/or silicon carbide. A blend between two or more materials is accordingly also possible.

The base layer can consists of a fibre-board or a particle-board, whereby the particle coated paper sheet is bonded to the base layer by laminating under heat and pressure or by gluing. The base layer can also consist of a number of conventional dry pre-preg webs or prepreg sheets respectively which are not coated with particles. The particle coated web or sheet respectively is placed on top of these conventional webs or sheets, whereby the resin in the uppermost of these webs respectively sheets normally consists of melamine-formaldehyde resin, while the rest of the webs respectively sheets preferably contains phenol-formaldehyde resin or phenol-urea formaldehyde resin, whereafter the webs respectively a stack of sheets continuously respectively discontinuously are laminated together with the surface layer by using a high pressure and an increased temperature.

The particle coated paper web or paper sheet often consists of a so-called overlay paper, preferably of α-cellulose.

It is, however also possible to coat the so-called decorative sheet with the hard particles. The decorative sheet can be patterned or monochromatic.

In some cases it is possible to coat the overlay sheet as well as the decorative sheet with particles or use two ore more particle coated overlay sheets or decorative sheets. It is also possible to place a conventional not particle coated overlay sheet on top of the particle coated sheet or sheets.

DETAILED DESCRIPTION OF THE PREFERRED EMBEDMENTS

Figure 1:
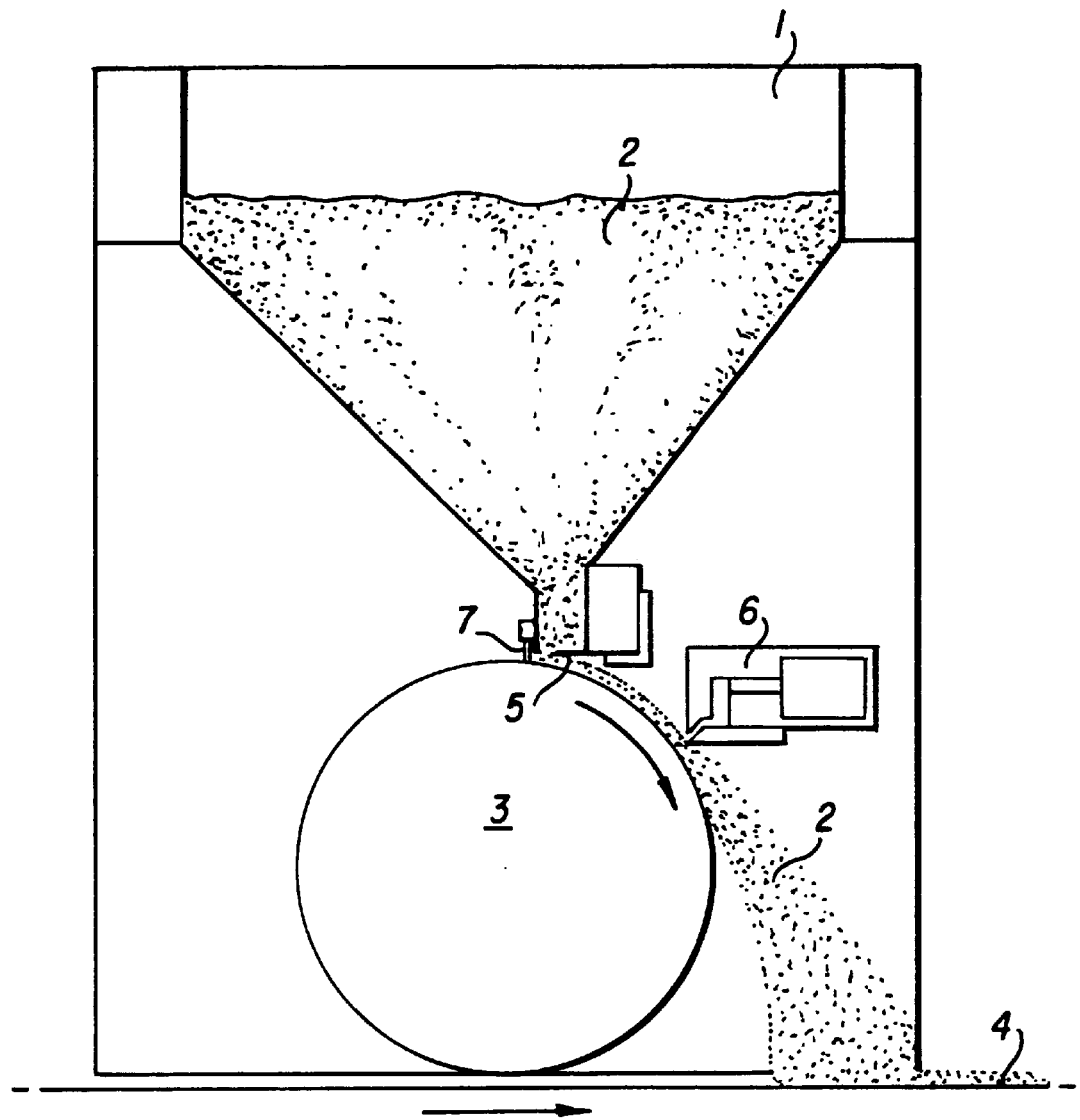
FIG. 1 is a device comprising a container 1 in which small hard particles 2 are distributed on a rotating doctor-roll 3 with an uneven surface placed under the container whereby the hard particles 2 fall down from the container 1 to the doctor-roll 3 and then be evenly distributed on a paper web 4 continuously fed under doctor-roll 3 according to U.S. Pat. No. 4,940,503. The device often comprises a scraper plate 5 and an air knife 6 or the like to help the hard particles 2 come loose from the doctor-roll 3 at a constant amount per unit of time. The device can also comprise a tightening brush 7.

The invention will be explained further in connection to the embodiment examples below, of which the examples 1–7 illustrates a first embodiment of the invention where the uppermost sheet in the laminate consists of a so-called overlay on the top side coated with a slurry of melamine-formaldehyde resin containing small hard particles, and on the lower sides coated with somewhat larger particles in the still wet melamine-formaldehyde resin which the paper has been impregnated with.

Example 8 represents a prior art laminate for comparison, which laminate was made in accordance with the U.S. Pat. No. 4,940,503 where the uppermost sheet in the laminate has been coated with rather big particles on the lower side in still wet melamine-formaldehyde resin which the paper has been impregnated with.

Examples 9 and 10 represent another embodiment of the invention where the uppermost sheet in the laminate is coated with a slurry of melamine-formaldehyde resin containing small hard particles. The lower side of this uppermost sheet is not coated with any particles. Instead somewhat bigger particles have been sprinkled on the still wet resin on the top side of the second uppermost melamine-formaldehyde resin impregnated paper sheet.

Example 11 represents a comparison test outside the scope of the invention. The uppermost sheet in the laminate consists of an overlay which on the top side has been coated with a slurry of melamine-formaldehyde resin containing small hard particles. The lower side of this paper sheet is not coated with any bigger hard particles, nor is there any second underlying sheet coated with bigger hard particles.

From the examples 1–7 and 9 and 10 according to the invention is it shown that a very good scratch resistance is achieved by the use of the small hard particles on the upper side of the uppermost sheet. The somewhat bigger particles on the lower side of the uppermost sheet or on the top side of the following sheet give a very good abrasion resistance.

The comparative test according to example 8 shows that a good abrasion resistance is achieved when bigger hard particles are used on the lower side of the uppermost sheet. The scratch resistance will however be rather poor.

The comparative test according to example 11 shows that a good scratch resistance is achieved when small hard particles is used on the top side of the uppermost sheet. The abrasion resistance will however be very poor if the bigger particles are left out on the lower side of the uppermost paper or on underlying paper.

The examples show the measured scratch resistance, measured by means of two different methods according to a modified version of ASTMD-2197. At the first method the sample is judged in a viewing cupboard at an eye—sample distance of 772–914 mm and at an observation angle between 45 and 75 degrees from the table surface. The sample is judged according a classification scale. This first method is called distance.

The second method is performed in the same way. The person who makes the test does however decide the angle and the distance himself so that the real scratch becomes visible. This second method is called real. A low value indicates the best scratch resistance.

In the examples the scratch resistance has only been measured by scratching across the manufacturing direction of the laminate (paper), since a scratch becomes more visible in this direction. Sometimes also the scratch resistance along the laminate is measured.

The abrasion was in the examples measured according to EN 438-2:6.

According to this standard the abrasion through the decorative layer of the finished laminates is measured in two steps. In the first step the so-called IP (initial-point) is measured, where the initial abrasion starts.

In step two the so called EP (end-point) is measured, where 95% of the decor is worn through.

Additionally the standard prescribes that the number of revolutions achieved with the testing machine in steps one and two are added and that the obtained sum is divided by 2. Hereby the 50% point for abrasion is obtained, which normally is the figure reported in standards and offprints.

In this and the following examples however only the IP is used.

EXAMPLE 1 a) One roll of so called overlay paper of α-cellulose with a surface weight of 25 g/m$^2$ was impregnated with a melamine-formaldehyde resin solution to a resin content of 57% by weight, calculated on dry impregnated paper. The top side of the wet paper web was sprinkled with aluminium oxide particles to an amount of 8 g/m$^2$. The particles had an average size of 50 μm. The particles were applied by using an apparatus as described in the U.S. Pat. No. 4.940,503.

The particle coated paper web was then continuously fed into a heating oven, where the solvent was evaporated while the resin cured to a so-called B-stage. The moisture content of the paper was after the drying 10% by weight. The other not sprinkled side of the paper web was coated with a slurry of melamine-formaldehyde resin containing aluminium oxide particles to an amount of 5.3% by weight. The average size of the particles was 1 μm.

The paper web was then continuously dried in an oven until the moisture content of the paper was 7% by weight.

The final resin content of the completely impregnated paper was 70% by weight calculated as dry impregnated paper and the total amount of added aluminium oxide particles was 8+2.7 g/m$^2$.

The paper web was cut into sheets of a suitable length.

b) One roll of so called overlay paper of α-cellulose with a surface weight of 25 g/m$^2$ was impregnated with a melamine-formaldehyde resin solution to a resin content of 70% by weight, calculated on dry impregnated paper. The top side of the wet paper web was sprinkled with aluminium oxide particles to an amount of 7 g/m$^2$ by using the same apparatus as in a) above. The particles were of an average size of 50 μm. The paper web was then dried to a moisture content of 7% by weight. The paper web was cut into sheets of the same length as in a) above.

c) One roll of so called decor paper with a surface weight of 100 g/m$^2$ was impregnated with a solution of melamine-formaldehyde resin to a resin content of 46% by weight, calculated on dry impregnated paper. The impregnated paper web was dried to a moisture content of 4% by weight.

The paper web was cut into sheets of the same length as in a) and b) above.

d) One roll of Kraft paper with a surface weight of 170 g/m² was impregnated with a phenol-formaldehyde resin solution to a resin content of 28% by weight, calculated on dry impregnated paper. The wet paper web was dried to a final moisture content of 7% by weight. The paper web was cut into sheets of the same length as above.

The impregnated paper sheets as described in a)–d) above were placed between two press plates in the following order; one paper a) with the side with the smallest particles oriented outwards, one paper b) with the sprinkled side oriented outwards, one paper c) and three papers d). Together the last mentioned papers, so-called base sheets, formed a base layer in the laminate which was manufactured by pressing of the sheets in a conventional multi-opening press during 80 minutes and at a pressure of 85 bar.

The properties of the manufactured laminate were as follows:

| | |
|---|---|
| Abrasion: | 16100 revolutions |
| Scratch resistance: | across/4 (distance) across/9 (real) |

EXAMPLE 2

The procedure according to example 1 was repeated with the difference that the melamine-formaldehyde slurry in step a) contained aluminium oxide particles with an average size of 3 µm instead of 1 µm.

The properties of the manufactured laminate were as follows:

| | |
|---|---|
| Abrasion: | 14050 revolutions |
| Scratch resistance: | across/3 (distance), across/3 (real) |

EXAMPLE 3

The procedure according to example 1 was repeated with the difference that the melamine-formaldehyde slurry in step a) contained 10.6% by weight of aluminium oxide particles instead of 5.3% by weight. Additionally the aluminium oxide particles had an average size of 5 µm instead of 1 µm. The total amount of particles was 8+5.4 g/m².

The properties of the manufactured laminate were as follows:

| | |
|---|---|
| Abrasion: | 15500 revolutions |
| Scratch resistance: | cross/1 (distance), cross/7 (real) |

EXAMPLE 4

The procedure according to example 3 was repeated with the difference that the melamine-formaldehyde slurry in step a) contained 15.9% by weight of aluminium oxide particles instead of 10.6% by weight. Also in this example the aluminium oxide particles had an average size of 5 µm. The total amount of particles added was 8+8.1 g/m².

The properties of the manufactured laminate were as follows:

| | |
|---|---|
| Abrasion: | 14200 revolutions |
| Scratch resistance: | across/1 (distance), across/1 (real) |

EXAMPLE 5

The procedure according to example 1 was repeated with the difference that the melamine-formaldehyde slurry in step a) contained aluminium oxide particles with an average size of 9 µm instead of 1 µm.

The properties of the manufactured laminate were as follows:

| | |
|---|---|
| Abrasion: | 15100 revolutions |
| Scratch resistance: | across/3 (distance), across/3 (real) |

EXAMPLE 6 a) One roll of so called overlay paper of α-cellulose with a surface weight of 25 g/m² was impregnated with a melamine-formaldehyde resin solution to a resin content of 57% by weight, calculated on dry impregnated paper. The top side of the wet paper web was sprinkled with aluminium oxide particles to an amount of 9 g/m². The particles were of an average size of 50 µm. The particles were applied by using an apparatus as described in the U.S. Pat. No. 4,940,503.

The particle sprinkled paper web was then continuously feed into a heating oven, where the solvent was evaporated while the resin cured to a so-called B-stage. The moisture content of the paper was after drying 10% by weight.

The other, not sprinkled side of the paper web was coated with a slurry of melamine-formaldehyde containing aluminium oxide particles to an amount of 10.6% by weight. The average size of the particles was 3 µm.

The paper web was then continuously dried in an oven until the moisture content of the paper was 7% by weight.

The final resin content in the completely impregnated paper was 72% by weight calculated as dry impregnated paper, and the total amount of added aluminium oxide particles was 9+5.4 g/m².

b) One roll of so-called overlay paper of α-cellulose with a surface weight of 25 g/m² was impregnated with a melamine-formaldehyde resin solution to a resin content of 72% by weight, calculated on dry impregnated paper. The paper web was then dried to a moisture content of 7% by weight.

c) One roll of so called decor paper with a surface weight of 100 g/m² was impregnated with a melamine-formaldehyde resin solution to a resin content of 46% by weight, calculated on dry impregnated paper. The impregnated paper web was dried to a moisture content of 4% by weight.

d) One roll of Kraft paper with a surface weight of 150 g/m² was impregnated with a phenol-formaldehyde resin solution to a resin content of 36% by weight, calculated on dry impregnated paper. The wet paper web was dried to a moisture content of 7% by weight.

The impregnated paper webs as described in a)–d) above were continuously feed in between the two press bands of a continuous-press in the following order; one paper a) with the side with the smallest particles oriented outwards, one paper b), one paper c) and three papers d).

The pressing cycle lasted for 20 seconds and the pressure was 35 bar. The laminate was then cut into suitable lengths.

The properties of the manufactured laminate were as follows:

| | |
|---|---|
| Abrasion: | 13900 revolutions |
| Scratch resistance: | across/3 (distance), across/5 (real) |

EXAMPLE 7

The procedure according to example 6 was repeated with the difference that the slurry of melamine-formaldehyde resin in step a) contained aluminium oxide particles to an amount of 5.3% by weight instead of 10.6% by weight. The average size of the particles was 1 $\mu$m instead of 3 $\mu$m. The total amount of added aluminium oxide particles was 9+2.7 g/m$^2$.

The properties of the manufactured laminate were as follows:

| | |
|---|---|
| Abrasion: | 13900 revolutions |
| Scratch resistance: | across/5 (distance) across/7 (real) |

EXAMPLE 8 a) One roll of so-called overlay paper of $\alpha$-cellulose with a surface weight of 25 g/m$^2$ was impregnated with a melamine-formaldehyde resin solution to a resin content of 70% by weight, calculated on dry impregnated paper. The top side of the wet paper web was sprinkled with aluminium oxide particles to an amount of 8 g/m$^2$. The particles were of an average size of 50 $\mu$m. The paper web was then continuously dried in a heating oven to a moisture content of 7% by weight. The other side of the paper was left untreated and was therefore not coated with any hard particles. The paper web was cut into sheets of a suitable length.

Step b), c) and d) were repeated according to example 1.

The impregnated paper sheets according to a)–d) above were placed between two press plates in the following order; one paper a) with the particle side oriented downwards, one paper b) with the sprinkled side oriented outwards, one paper c) and three papers d). The pressing was conducted in the same way as in example 1.

The properties of the manufactured laminate were as follows:

| | |
|---|---|
| Abrasion: | 13550 revolutions |
| Scratch resistance: | across/31 (distance), across/41 (real) |

EXAMPLE 9 a) One roll of so-called overlay paper of $\alpha$-cellulose with a surface weight of 25 g/m$^2$ was impregnated with a melamine-formaldehyde resin solution to a resin content of 50% by weight, calculated on dry impregnated paper. The paper web was then dried to a moisture content of 7.2% by weight.

One side of the paper was coated with a slurry of a solution of melamine-formaldehyde resin containing aluminium oxide particles to an amount of 5.0% by weight. The average size of the particles was 3 $\mu$m.

The paper web was then continuously dried in an oven until the moisture content in the paper was 8.6% by weight.

The final resin content of the completely impregnated paper was 70% by weight calculated on dry impregnated paper, and the total amount of added aluminium oxide particles was 3.3 g/m$^2$.

The paper web was cut into sheets of a suitable length.

b) One roll of patterned decor paper of $\alpha$-cellulose with a surface weight of 38 g/m$^2$ was impregnated with a melamine-formaldehyde resin solution to a resin content of 50% by weight, calculated on dry impregnated paper. The top side of the wet paper web was sprinkled with aluminium oxide particles to an amount of 9.5 g/m$^2$ by using the same apparatus as in a) above. The particles were of an average size of 50 $\mu$m. The paper web was then dried to a moisture content of 6.7% by weight. The paper web was cut into sheets of the same length as in a) above.

c) One roll of monochromatic decor paper with a surface weight of 100 g/m$^2$ was impregnated with a melamine-formaldehyde resin solution to a resin content of 54% by weight, calculated on dry impregnated paper. The impregnated paper web was dried to a moisture content of 6.5% by weight.

The paper web was cut into sheets of the same length as in a) and b) above.

d) One roll of Kraft paper with a surface weight of 170 g/m$^2$ was impregnated with a phenol-formaldehyde resin solution to a resin content of 28% by weight, calculated on dry impregnated paper. The wet paper web was dried to a final moisture content of 7% by weight. The paper web was cut into sheets of the same length as above.

The impregnated paper sheets as described in a)–d) above were placed between two press plates in the following order; one paper a) with the particle coated side oriented outwards, three paper b) with the sprinkled side oriented outwards, one paper c) and three papers d). Together the last mentioned papers, so called base sheets formed a base later of the laminate which was manufactured by pressing the sheets in a conventional multi-opening press during 80 minutes and at a pressure of 85 bar.

The properties of the manufactured laminate were as follows:

| | |
|---|---|
| Abrasion: | 26100 revoiutions |
| Scratch resistance: | across/1 (distance) across/9 (real) |

EXAMPLE 10 a) One roll of patterned decor paper of $\alpha$-cellulose with a surface weight of 41 g/m$^2$ was impregnated with a melamine-formaldehyde resin solution to a resin content of 41% by weight, calculated on dry impregnated paper. The paper web was then dried to a moisture content of 6.7% by weight. One side of the paper web was then coated with a slurry of melamine-formaldehyde resin containing aluminium oxide particles to an amount of 5% by weight. The particles had an average size of 3 $\mu$m.

The paper web was then continuously dried in an oven until the moisture content of the paper was 7.4% by weight.

The final resin content of the completely impregnated paper was 63% by weight calculated on dry impregnated paper, and the total amount of added aluminium oxide particles was 3.3 g/m².

The paper web was cut into sheets of a suitable length.

b) One roll of patterned decor paper of α-cellulose with a surface weight of 41 g/m² was impregnated with a melamine-formaldehyde resin solution to a resin content of 49% by weight, calculated on dry impregnated paper. The top side of the wet paper web was sprinkled with aluminium oxide particles to an amount of 9.5 g/m². The particles were of an average size of 50 μm. The paper web was then dried to a moisture content of 7% by weight. The paper web was cut into sheets of the same length as in a) above.

The steps c) and d) according to example 9 were repeated and a laminate was manufacture in the same way as in example 9.

The impregnated paper sheets as described in a)–d) above were placed in the following order: one paper a) with the particle coated side oriented outwards, three papers b) with the sprinkled side oriented outwards, one paper c) and three papers d).

The properties of the manufactured laminate were as follows:

| | |
|---|---|
| Abrasion: | 27100 revolutions |
| Scratch resistance: | across/5 (distance), across/9 (real) |

EXAMPLE 11 a) One roll of so-called overlay paper of α-cellulose with a surface weight of 25 g/m² was impregnated with a melamine-formaldehyde resin solution to a resin content of 50% by weight, calculated on dry impregnated paper.

The paper web was then continuously dried in a heating oven. The moisture content in the paper, was after drying 10% by weight.

One side of the paper web, was coated with a slurry of a solution of melamine-formaldehyde resin containing aluminium oxide particles to an amount of 5.0% by weight. The average size of the particles was 3 μm.

The paper web was then continuously dried in an oven until the moisture content of the paper was 7% by weight.

The final resin content in the completely impregnated paper was 70% by weight calculated on dry impregnated paper, and the total amount of added aluminium oxide particles was 3.3 g/m².

The paper web was cut into sheets of a suitable length.

b) One roll of so-called decor paper with a surface weight of 100 g/m² was impregnated with a melamine-formaldehyde resin solution to a resin content of 46% by weight, calculated on dry impregnated paper. The paper web was then dried to a moisture content of 4% by weight.

The paper web was cut into sheets of the same length as in a) above.

c) One roll of Kraft paper with a surface weight of 170 g/m² was impregnated with a phenol-formaldehyde resin solution to a resin content of 28% by weight, calculated on dry impregnated paper. The wet paper web was dried to a moisture content of 7% by weight. The paper web was cut into sheets of the same length as above.

The impregnated paper sheets as described in a)–c) above were placed between two press plates in the following order: one paper a) with the particle coated side oriented outwards, one paper, b) and three papers c). Together the three last mentioned papers, so called base sheets, formed a base layer of the laminate which was manufactured by pressing of the sheets in a conventional multi-opening press during 80 minutes and at a pressure of 85 bar.

The properties of the manufactured laminate were as follows:

| | |
|---|---|
| Abrasion: | 200 revolutions |
| Scratch resistance: | across/5 (distance), across/9 (real) |

What is claimed is:

1. A process for the manufacture of a decorative thermosetting laminate with an abrasion resistant and a scratch resistant surface layer, said process comprising:
    providing a resin-impregnated paper web with one side of the web having about 1–15 g/m² of hard particles with an average particle size of about 1–15 μm and a second side of the web having about 2–20 g/m² of hard particles with an average particle size of about 30–90 μm;
    orienting said paper web such that said one side having the hard particles of smaller average particle size is directed toward a pressing surface; orienting the second side of the web so as to face a base layer;
    and pressing said paper web with said pressing surface under heat and pressure for a time sufficient to cure said resin and bond said paper web and said base layer into a laminate.

2. A process for the manufacture of a decorative thermosetting laminate with an abrasion resistant and a scratch resistant surface layer, said process comprising:
    providing a first resin-impregnated paper web with one side of the web having about 1–15 g/m² of hard particles with an average particle size of about 1–15 μm;
    providing a second resin impregnated paper web with one side of the web having about 2–20 g/m² of hard particles with an average particle size of about 30–90 μm;
    orienting said first paper web having the smaller particles thereon such that said hard particles are directed towards a pressing surface;
    locating said second resin impregnated paper web on a side of said first paper web remote from said pressing surface and adjacent a base layer;
    subjecting said first and second paper webs and said base layer to conditions of heat and pressure from said pressing surface for a time sufficient to cure said resin and bond said first and said second sheets and said base layer into a laminate.

3. The process according to claim 1 wherein said paper web and said base layer are simultaneously pressed.

4. The process according to claim 2 wherein said subjecting to pressure step is continuous.

5. The process according to claim 1 wherein said resin is melamine-formaldehyde resin.

6. The process according to claim 2 wherein said first and second resin is melamine-formaldehyde resin.

7. The process of claim 1 wherein said one side has hard particles of average particle size of about 1–9 μm.

8. The process of claim 1 wherein said second side has hard particles of average particle size of about 40–70 μm.

9. The process according to claim 1 wherein said base layer comprises a plurality of dry pre-preg sheets impregnated with a resin selected from the group consisting of phenol-formaldehyde resin and phenol-urea-formaldehyde resin.

10. The process according to claim 2 wherein said base layer comprises a plurality of dry pre-preg sheets impregnated with a resin selected from the group consisting of phenol-formaldehyde resin and phenol-urea-formaldehyde resin.

11. The process of claim 1 wherein said base layer comprises a board material selected from the group consisting of fibre-board and particle board.

12. The process of claim 2 wherein said base layer comprises a board material selected from the group consisting of fibre-board and particle board.

13. The process of claim 1 wherein said paper web comprises an overlay paper.

14. The process of claim 1 wherein said paper web comprises a decorative sheet.

15. The process according to claim 1 wherein said hard particles are selected from the group consisting of silicon dioxide, aluminum oxide, silicon carbide and mixtures thereof.

16. The process according to claim 1 wherein another hard particle containing sheet is placed between said paper web and said base layer prior to said pressing step.

17. The process according to claim 2 wherein said first resin-impregnated paper web contains hard particles with an average particle size of about 1–9 μm.

18. The process according to claim 2 wherein said first resin-impregnated paper web is an overlay sheet.

19. The process according to claim 2 wherein said first resin-impregnated paper web is a decorative sheet.

20. The process according to claim 2 wherein said side of said second resin impregnated paper web having the hard particles thereon is oriented towards said pressing surface.

21. A process for the manufacture of a decorative thermosetting laminate with an abrasion resistant and scratch resistant surface layer, said laminate comprising a paper web with a thermosetting resin, said process comprising impregnating a continuous paper web with a thermosetting resin, and with the surface of the paper web wetted with said resin, coating one side of the continuous paper with 2–20 g/m² of hard particles with an average particle size of about 30–90 μm by means of a device comprising a container containing the hard particles and a rotating doctor-roll with an uneven surface placed under the container, whereby the particles are intended to fall down from the container to the doctor-roll and then be evenly distributed over the surface of resin on the paper web continuously fed under the doctor-roll, then drying the resin with the particles coated thereon, coating a second side of the web with a thermosetting resin mixture containing 1–15 g/m² of hard particles with an average particle size of about 1–15 μm, drying the resin with the particles therein, orienting said paper web such that said one side having the hard particles of smaller average particle size is directed toward a pressing surface, orienting the second side of the web so as to face a base layer; and pressing said paper web with said pressing surface under heat and pressure for a time sufficient to cure said resin and bond said paper web and said base layer together and form a laminate.

22. The process of claim 21 wherein the particle coated impregnated paper web is cut into sheets prior to said pressing step.

23. The process of claim 21 wherein said pressing step is continuous.

24. The process of claim 21 wherein another hard particle-coated paper web is placed between said paper web and said base layer prior to said pressing step.

25. The process of claim 21 wherein said decorative thermosetting laminate is a flooring laminate.

26. A process for the manufacture of a decorative thermosetting laminate with an abrasion resistant and scratch resistant surface layer, said laminate comprising a paper web with a thermosetting resin, said process comprising impregnating a first continuous paper web with a thermosetting resin, and with the surface of the paper web wetted with said resin, coating one side of the continuous paper with 2–20 g/m² of hard particles with an average particle size of about 30–90 μm by means of a device comprising a container containing the hard particles and a rotating doctor-roll with an uneven surface placed under the container, whereby the particles are intended to fall down from the container to the doctor-roll and then be evenly distributed over the surface of resin on the paper web continuously fed under the doctor-roll, coating one side of a second paper web with a thermosetting resin mixture containing 1–15 g/m² of hard particles with an average particle size of about 1–15 μm, orienting said second paper web such that said one side having the hard particles of smaller average particle size is directed toward a pressing surface, placing said first web between said second web and a base layer to form a composite; and pressing said composite with said pressing surface under heat and pressure for a time sufficient to cure said resin and bond said first and said second paper web and said base layer together and form a laminate.

27. The process of claim 26 wherein the particle coated impregnated paper web is cut into sheets prior to said pressing step.

28. The process of claim 26 wherein said pressing step is continuous.

29. The process of claim 21 wherein said decorative thermosetting laminate is a flooring laminate.

* * * * *